United States Patent [19]
Porter

[11] 3,815,176
[45] June 11, 1974

[54] VEHICLE BODY HOOD HINGE

[75] Inventor: Charles L. Porter, Lansing, Mich.

[73] Assignee: General Motors Corporation, Detroit, Mich.

[22] Filed: Aug. 2, 1973

[21] Appl. No.: 384,979

[52] U.S. Cl............................. 16/128.1, 180/69
[51] Int. Cl............................................. E05d 1/00
[58] Field of Search............ 16/128.1, 137; 180/69; 296/76; 292/DIG. 39, 300

[56] References Cited
UNITED STATES PATENTS

| | | | |
|---|---|---|---|
| 2,197,648 | 4/1940 | Mersheimer | 16/128.1 |
| 3,225,856 | 12/1965 | Caramanna | 16/128.1 |
| 3,351,975 | 11/1967 | Koji Goto | 16/128.1 |
| 3,754,614 | 8/1973 | Habas | 296/76 |

Primary Examiner—Bobby R. Gay
Assistant Examiner—Doris L. Troutman
Attorney, Agent, or Firm—J. A. Kushman

[57] ABSTRACT

A hinge for the rear end of a hood that selectively closes a vehicle body forward engine compartment opening includes interconnected body and hood hinge members movable relative to each other between hood open and closed positions. The rear end of the body hinge member includes a planar hook-shaped flange located in a vertical orientation and defining a forwardly facing notch, and the rear end of the hood hinge member includes a generally planar flange defining an elongated rearwardly opening slot. As the hinge members move to the hood closed position, the flange of the hood hinge member moves to a generally horizontal operation and into an interreceived relationship with the flange of the body hinge member so that the notch receives the hood flange and the slot receives the body flange to limit forced movement of the rear end of the hood in vertical, lateral and rearward directions. A resilient stop mounted on the body hinge member adjacent the notched flange thereof engages the hood hinge member adjacent its slotted flange so as to resiliently position the flanges with respect to each other.

3 Claims, 3 Drawing Figures 3,815,176

VEHICLE BODY HOOD HINGE

BACKGROUND OF THE INVENTION

This invention relates generally to a vehicle body hood hinge and more particularly to a hinge adapted to be used at the rear end of a hood for closing the access opening of a forward vehicle engine compartment.

U.S. Pat. No. 3,643,755 Gionet et al, which is assigned to the assignee of the present invention, discloses a hood hinge for the rear end of a forward engine compartment hood in which a pin of the hinge is sheared during forced rearward shifting of the hood in the manner that may occur during a frontal vehicle impact with an obstacle. The shearing of this pin causes a support link of the hinge to pivot downwardly and to thereby move the rear end of the hood downwardly as it shifts to the rear. This guiding of the hood movement prevents it from moving upwardly over the vehicle body cowl structure at the rear end of the engine compartment and toward the vehicle windshield.

SUMMARY OF THE INVENTION

This invention provides a hood hinge that limits forced shifting of the rear end of the hood by way of a pair of cooperable flanges on the interconnected body and hood hinge members of the hinge.

One feature of the invention is that it provides a vehicle body hood hinge whose hood hinge member includes a generally planar flange defining a rearwardly facing opening and whose body hinge member includes a generally planar flange defining a forwardly facing opening, and during hood closing movement of the hinge these flanges move into an interreceived relationship with each flange opening receiving the other flange and with the flanges oriented perpendicular to each other in generally vertical and horizontal planes to limit forced movement of the rear end of the hood in vertical, lateral and rearward directions. Another feature of the invention is that the flange of the body hinge member is oriented in the vertical plane and its forwardly facing opening has a notch-shaped configuration, and the flange of the hood hinge member moves to the horizontal plane as the hinge moves to closed position and its rearwardly facing opening has an elongated slot-shaped configuration. Another feature of the invention is that the flange of the body hinge member has a hook-shaped appearance that defines the forwardly opening notch and the hinge includes a resilient member mounted on one of the hinge members adjacent the flange thereof and engaging the other hinge member adjacent the other flange when the hinge members are in closed position so as to resiliently position the flanges with respect to each other.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figure 1:
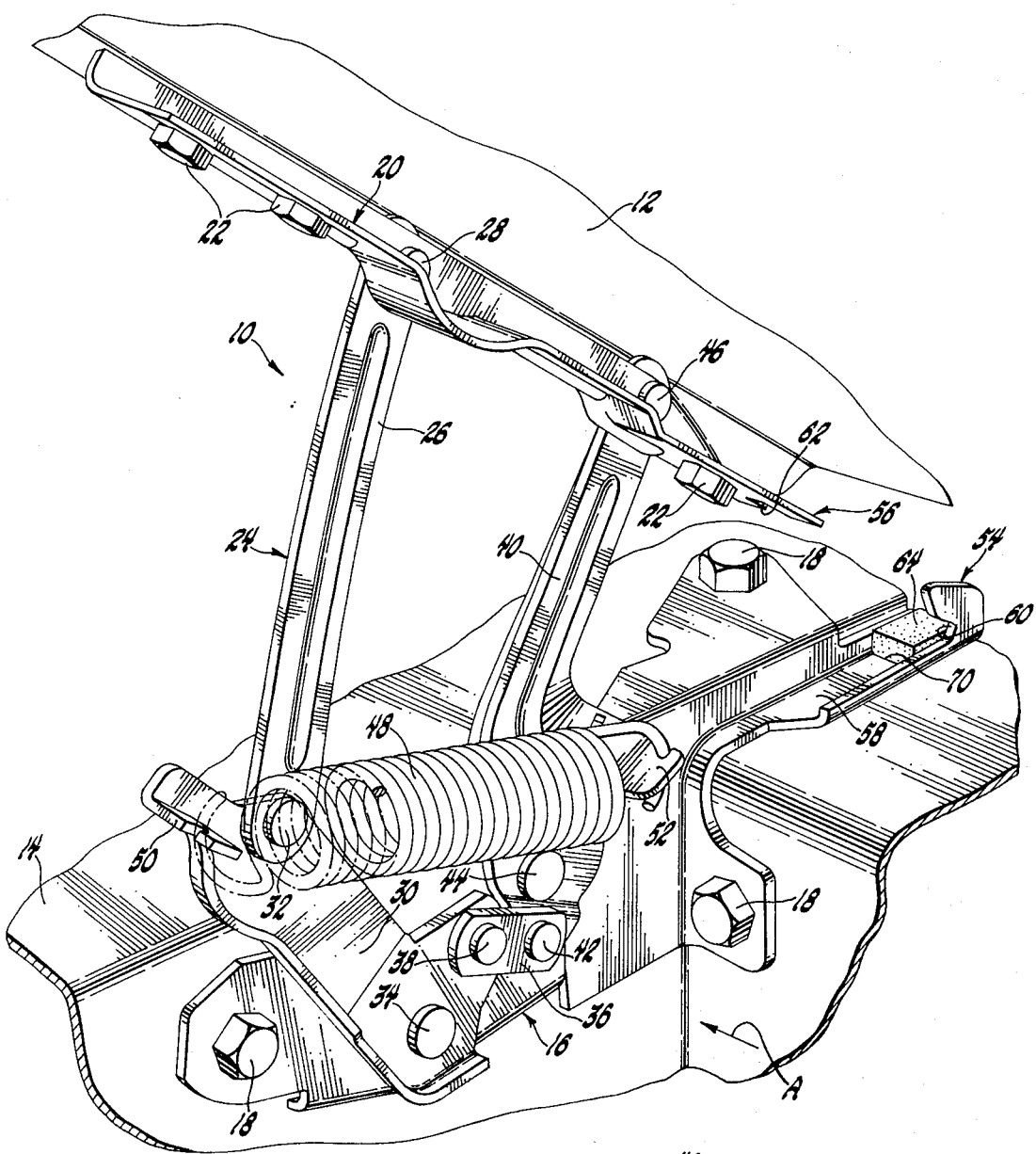
FIG. 1 is a perspective view of a vehicle body hood hinge, according to this invention, with the body and hood hinge members of the hinge shown in a hood open position where the planar flanges defining forward and rearwardly facing openings at their rear ends are located in a spaced relationship.

Referring to FIG. 1 of the drawings, a vehicle body hood hinge is generally indicated by 10 and is adapted to support the rear end of a hood 12 on a vehicle body 14 adjacent the rear end of a forward engine compartment of the vehicle. One such hinge is used at each lateral side of the rear end of the hood, the hinges differing only in being symmetrical about the center line of the vehicle, and the hood is thereby supported for movement between open and closed positions. The hinge includes a body hinge member 16 that is secured to the body by bolts 18 and a hood hinge member 20 secured to the hood 12 by bolts 22. The body and hood hinge members are interconnected for their movement relative to each other by a conventional linkage indicated generally by 24. This linkage includes an elongated link 26 whose upper end is pivoted to the forward end of hood hinge member 20 by a pin 28, only a portion of which is shown. The lower end of link 26 is pivoted to the longer leg of a somewhat L-shaped link 30 by a pin 32. Link 30 is pivoted to the body hinge member 16 at the juncture of its legs by a pin 34. The shorter leg of link 30 is pivoted to one end of a control link 36 by a pin 38. The other end of control link 36 is pivoted to the handle portion of a somewhat pistol-shaped link 40 by a pin 42. The handle portion of link 40 is also pivoted to the body hinge member 16 by way of a pin 44, and the end of its barrel portion is pivoted to the hood hinge member 20 by way of a pin 46 rearward of pin 28.

A helical spring 48 extends between an attachment flange 50 on link 30 and an attachment flange 52 on link 40 so as to selectively and alternately bias the hinge to either the open position that is shown or the closed position where hood 12 closes the engine compartment of vehicle body 14. During closing movement of the hood 12, the pistol-shaped link 40 pivots rearwardly about pin 44, clockwise as viewed in the direction of arrow A, and thereby moves the rear end of hood hinge member 20 in a downward and rearward direction. The L-shaped link 30 pivots counterclockwise during this same movement and shifts the lower end of link 26 downwardly and forwardly. The upper end of link 26 thus moves downwardly so that pin 28 pulls the forward end of hood hinge member 20 downward. Control link 36 coordinates the movement of links 30 and 40 during this closing movement, as well as during opening movement. The center line of spring 48 moves below the axis of pin 44 during the closing movement of hinge 10 and thereafter biases the hinge to its hood closed position. Opening movement of the hinge moves the links in the opposite directions as the closing movement so that the center line of spring 48 moves above pin 44 and causes the spring action to then bias the hinge to its open position.

Figure 2:
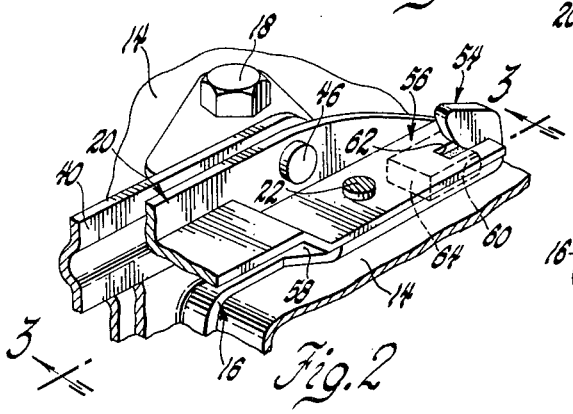
FIG. 2 is a perspective view of a portion of the hood hinge shown in hood closed position where the flanges of the hinge members are located in an interreceived relationship to limit forced vertical, lateral and rearward movement of the rear end of a hood supported by the hinge.

Adjacent the rear end of the hinge, the body and hood hinge members 16 and 20 respectively include generally planar flanges 54 and 56 that are constructed in a manner according to this invention. Flange 54 of the body hinge member 16 is bent upwardly from a rearward horizontal portion 58 of the body hinge member so as to be located in a vertical plane and has a generally hook-shaped configuration that defines a forwardly facing opening or notch 60 with a somewhat rounded V-shaped appearance. The rear end of the hood hinge member 20 defines a rearwardly facing opening or slot 62, FIG. 2, that is somewhat elongated. As the hinge 10 is moved to its closed position, the flange 56 moves rearwardly to a horizontal orientation and into an interreceived relationship with flange 54 so that notch 60 receives flange 56 and slot 62 receives flange 54 in the manner shown by FIGS. 2 and 3. When impact forces associated with a frontal vehicle impact attempt to move the rear end of hood 12 vertically or rearwardly while these flanges are in their interreceived relationship, engagement of the end wall of slot 62 in flange 56 and the surface of flange 54 defining notch 60 will limit such movement. Likewise, engagement between the sides of flange 54 and the opposed side walls of slot 62 in flange 56 limits any attempted lateral movement of the rear end of the hood under similar conditions.

Figure 3:
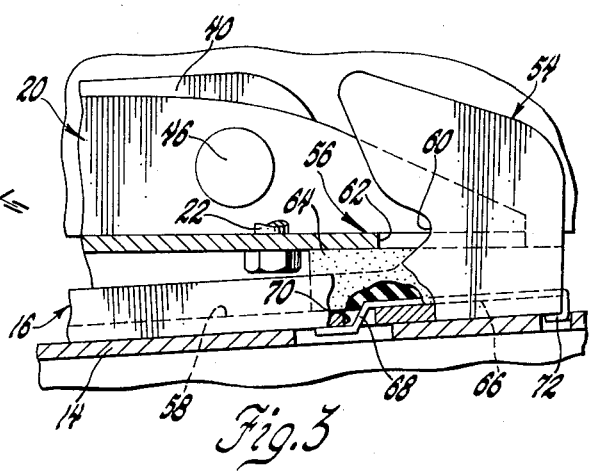
FIG. 3 is a slightly enlarged sectional view of the hinge taken along line 3—3 of FIG. 2 and further shows the interreceived flanges that limit this forced hood movement.

A rubber member or stop 64 is mounted on the rearward horizontal portion 58 of body hinge member 16. A metal insert or strap 66, see FIG. 3, is molded within rubber stop 64 and has a forward end 68 inserted downwardly through an aperture 70 in the horizontal portion 58 of the body hinge member and bent forward below the front end of this aperture to secure this end of the strap. The rear end of metal strap 66 is indicated by 72 and extends around the rear end of this horizontal portion of body hinge member 16 to secure the rear end of the strap to the body hinge member. The strap 66 thus secures the stop 64 in the position shown on the body hinge member. Suitable apertures in the portion of the vehicle body 14 adjacent where this stop is positioned receive the bent ends 68 and 72 of metal strap 66 so that a flush mounting is provided. When the hinge 10 is in the hood closed position, the stop 64 engages the flange 56 at the rear end of hood hinge member 20 to resiliently position flanges 54 and 56 with respect to each other. It is, of course, possible for stop 64 to be mounted in a reverse manner on the hood hinge member 20 and to engage the body hinge member 16 adjacent flange 54 to provide a similar resilient positioning of these flanges with respect to each other.

It is thus evident from the foregoing description that this invention provides a simple and effective manner of limiting forced vertical, lateral and rearward movement of the rear end of a vehicle body forward engine compartment hood.

What is claimed is:

1. A vehicle body hood hinge comprising, a body hinge member adapted to be mounted on a vehicle body adjacent the rear end of a forward engine compartment thereof, a hood hinge member adapted to be mounted on the rear end of a hood for closing the upper side of the engine compartment, means connecting the body and hood hinge members for movement relative to each other between hood open and closed positions, the body hinge member including a generally planar flange defining a forwardly facing opening, the hood hinge member including a generally planar flange defining a rearwardly facing opening, and movement of the hinge members to closed position moving the flanges into an interreceived relationship with each flange opening receiving the other flange and with the flanges oriented in generally vertical and horizontal planes to thereby limit forced vertical, lateral and rearward movement of the rear end of the hood with respect to the vehicle body.

2. A vehicle body hood hinge comprising, a body hinge member adapted to be mounted on a vehicle body adjacent the rear end of a forward engine compartment thereof, a hood hinge member adapted to be mounted on the rear end of a hood for closing the upper side of the engine compartment, means connecting the body and hood hinge members for movement relative to each other between hood open and closed positions, the body hinge member including a generally planar flange oriented in a generally vertical plane and defining a forwardly opening notch, the hood hinge member including a generally planar flange defining a rearwardly opening slot, and movement of the hinge members to closed position moving the hood flange to a generally horizontal orientation and the flanges into an interreceived relationship where the notch receives the hood flange and the slot receives the body flange to thereby limit forced vertical, lateral and rearward movement of the rear end of the hood with respect to the vehicle body.

3. A vehicle body hood hinge comprising, a body hinge member adapted to be mounted on a vehicle body adjacent the rear end of a forward engine compartment thereof, a hood hinge member adapted to be mounted on the rear end of a hood for closing the upper side of the engine compartment, means connecting the body and hood members for movement relative to each other between hood open and closed positions, the body hinge member including a generally planar hook-shaped flange oriented in a generally vertical plane and defining a forwardly opening notch, the hood hinge member including a generally planar flange defining an elongated rearwardly opening slot, and movement of the hinge members to closed position moving the hood flange to a generally horizontal orientation and the flanges into an interreceived relationship where the notch receives the hood flange and the slot receives the body flange to thereby limit forced vertical, lateral and rearward movement of the rear end of the hood with respect to the vehicle body, and a resilient member mounted on one of the hinge members adjacent the flange thereof and engaging the other hinge member adjacent the flange thereof when the hinge members are in closed position so as to resiliently position these flanges with respect to each other.

* * * * *

PO-1050
(5/69)

UNITED STATES PATENT OFFICE
CERTIFICATE OF CORRECTION

Patent No. 3,815,176          Dated June 11, 1974

Inventor(s) Charles L. Porter

It is certified that error appears in the above-identified patent and that said Letters Patent are hereby corrected as shown below:

In the Abstract, line 13, the word "operation" should read -- orientation --.

Signed and sealed this 22nd day of October 1974.

(SEAL)
Attest:

McCOY M. GIBSON JR.          C. MARSHALL DANN
Attesting Officer            Commissioner of Patents